United States Patent [19]
Victory

[11] Patent Number: 5,184,543
[45] Date of Patent: Feb. 9, 1993

[54] MOTORIZED AIR PRESSURE SEASONER

[76] Inventor: Richard F. Victory, P.O. Box 450248, Kissimmee, Fla. 34745

[21] Appl. No.: 689,637

[22] Filed: Apr. 23, 1991

[51] Int. Cl.⁵ .......................... A23B 4/02; A23L 1/31; A23L 3/34
[52] U.S. Cl. ........................ 99/533; 99/345; 99/450.8; 99/494; 99/516
[58] Field of Search .............. 99/494, 516, 532, 533, 99/535, 345–347, 450.8; 426/281; 27/24.1, 24.2; 452/146

[56] References Cited

U.S. PATENT DOCUMENTS

| | | | |
|---|---|---|---|
| 3,296,953 | 1/1967 | Bjorn-Henriksen et al. | 99/533 |
| 3,410,457 | 11/1968 | Brown | 99/532 |
| 3,483,810 | 12/1969 | Peters et al. | 99/532 |
| 3,581,651 | 6/1971 | Johnson | 452/146 |
| 3,615,704 | 10/1971 | Pederson et al. | 99/533 |
| 3,677,169 | 7/1972 | Francis | 99/533 |
| 3,762,307 | 10/1973 | Badovinac | 99/345 |
| 4,220,669 | 9/1980 | Townsend | 426/281 |
| 4,254,700 | 3/1981 | Fleming | 99/535 |
| 4,774,879 | 10/1988 | Roedel | 99/535 |
| 4,864,922 | 9/1989 | Higashimoto | 99/533 |

*Primary Examiner*—Timothy F. Simone
*Attorney, Agent, or Firm*—H. Jay Spiegel

[57] ABSTRACT

Disclosed is a seasoning device having a chamber designed to be filled with, for example, liquid and granular seasonings mixed together and having a plurality of hollow needles forming outlets from the chamber. The device includes a pumping mechanism which is motorized and battery operated and designed to pressurize the chamber to cause movement of a piston follower to cause expulsion of the seasoning through the needles as the needles are pulled from embedded positions within a piece of meat or fish. The depth of penetration of the needles may be selectively adjusted.

5 Claims, 3 Drawing Sheets

MOTORIZED AIR PRESSURE SEASONER

BACKGROUND OF THE INVENTION

The present invention relates to a motorized air pressure seasoner. In the prior art, seasoning devices using needles designed to be embedded in meat or fish are known. U.S. Pat. No. 3,441,980 to Defenbaugh discloses a meat tenderizing device having a plurality of tenderizing prongs mounted on a handle, which prongs include spiral-shaped projections. The present invention differs from the teachings of Defenbaugh for many reasons including the provision of pumping means to pressurize a supply of granular seasoning designed to be expelled through openings in needle-like prongs.

U.S. Pat. No. 3,762,307 to Badovinac discloses a flavor cup including a plurality of hollow prongs designed to be embedded within meat and to supply a liquid flavoring into holes formed thereby. The present invention differs from the teachings of this patent by providing mechanized pressurizing means for forcing seasoning through openings in a series of elongated prongs.

SUMMARY OF THE INVENTION

The present invention relates to a motorized air pressure seasoner. The present invention includes the following interrelated objects, aspects and features:

A) In a first aspect, the present invention includes a chamber having outlets consisting of a plurality of hollow tubular spike-like prongs designed to be embedded within meat or fish. The chamber is mounted on a housing in such a manner that the chamber may be adjusted up and down so that, in combination with an end wall of the housing, the depth of penetration of the prongs may be adjusted.

B) The housing contains a pump which is motor driven and powered by a replaceable battery. In the preferred embodiment, the pump is a bellows-type supply and exhaust pump which is reciprocated via rotations of a motor shaft translated to reciprocations by virtue of a crank arm. When the bellows expands, air from the atmosphere is sucked therein. On the compression stroke, the air is forcefully pumped through a conduit and into the chamber to provide an increase in the internal pressure in the chamber designed to force a follower piston downwardly to force seasoning out through the passageways through the prongs.

C) The chamber may be disassembled from the housing for cleaning and for the provision of allowing loading of the chamber with a desired seasoning.

As such, it is a first object of the present invention to provide a motorized air pressure seasoner.

It is a further object of the present invention to provide such a device using a supply and exhaust pump to pressurize a chamber filled with seasoning.

It is a still further object of the present invention to provide such a device wherein the outlets from the chamber consist of a plurality of hollow tubular spike-like prongs designed to be embedded in flesh.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
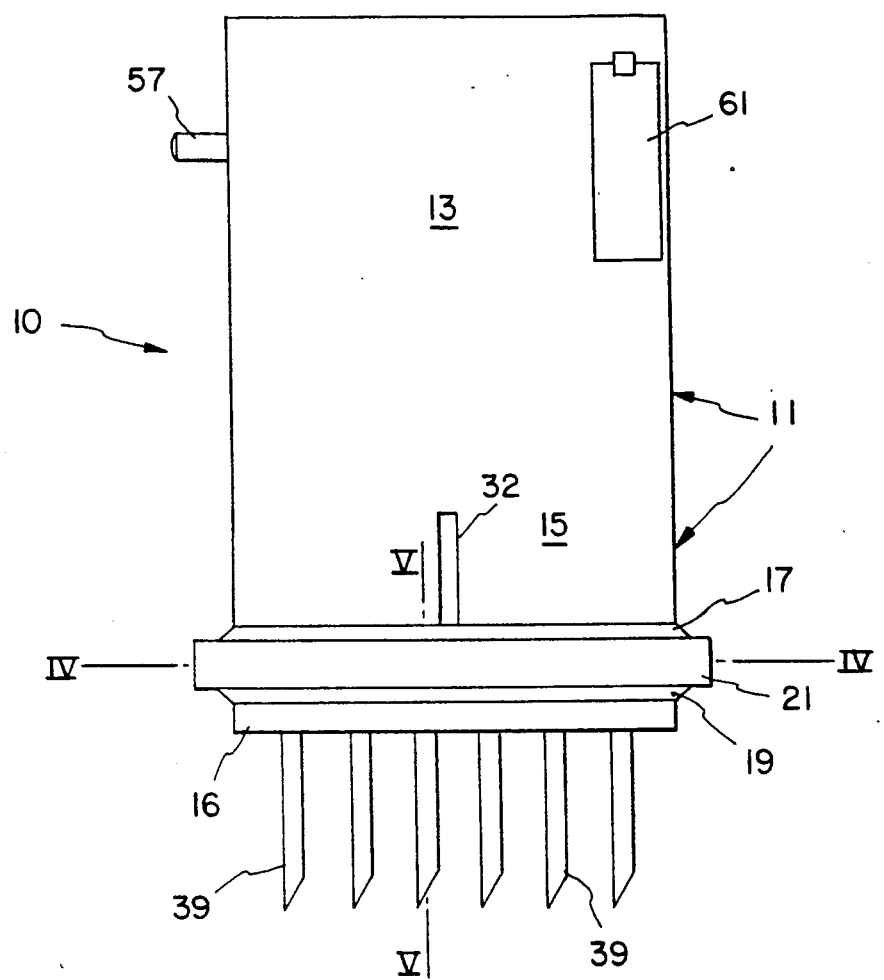
FIG. 1 shows a side view of the present invention.
Figure 4:
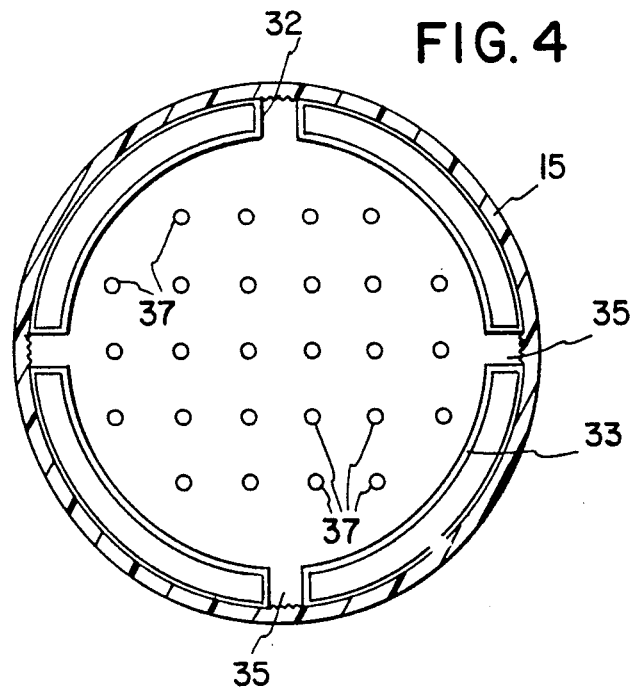
FIG. 4 shows a cross-sectional view along the line IV—IV of FIG. 1.
Figure 5:
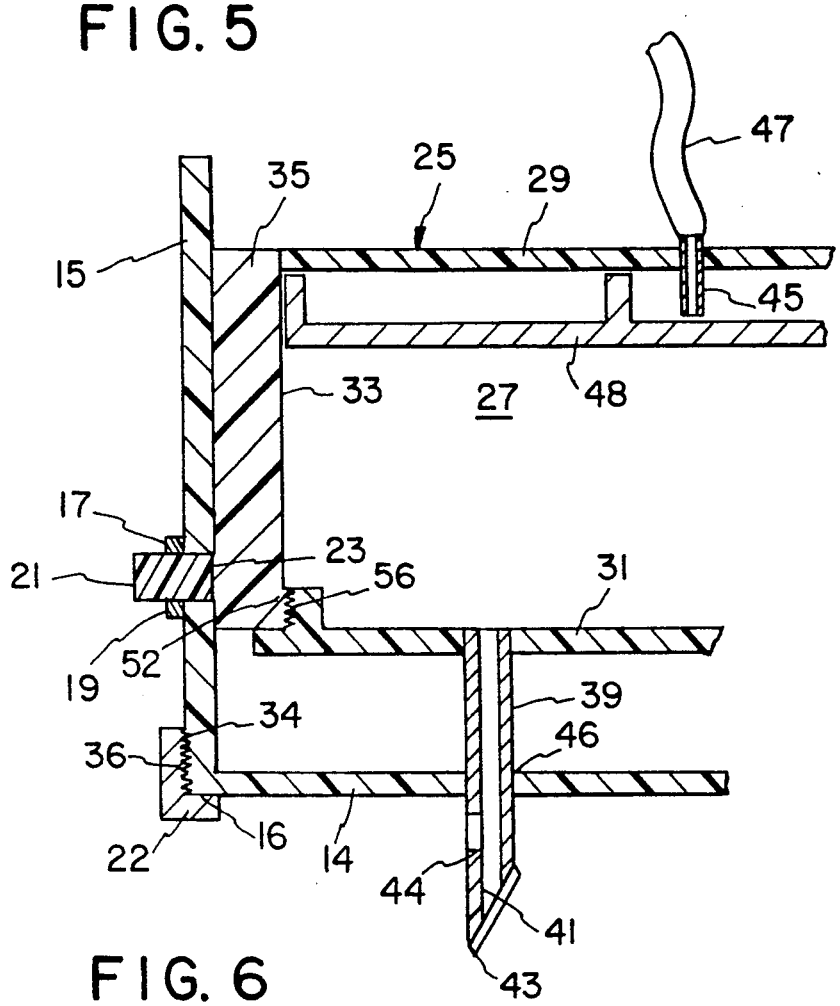
FIG. 5 shows a cross-sectional view along the line V—V of FIG. 1.

With reference, first, to FIG. 1, the invention is generally designated by the reference numeral 10 and is seen to include a housing 11 made of one piece including an upper region 13 and a lower region 15. With particular reference to FIGS. 1, 4 and 5, it is seen that the lower region 15 of the housing 11 includes shoulders 17 and 19 capturing a rotatable ring 21 having an internal surface 23 (FIG. 5) which is threaded.

With further reference to FIGS. 4 and 5, it is seen that within the lower region 15 of the housing 11 is carried a container 25 having an inner chamber 27, a top wall 29 and a bottom wall 31 as well as a peripheral wall 33. With particular reference to FIG. 4, it is seen that four radially outwardly extending ribs 35 are provided on the container 25, which ribs 35 are externally threaded from top to bottom in a manner complimentary to the threading of the inner wall 23 of the ring 21. The ribs extend through elongated slots 32. Thus, as should be understood, rotations of the ring 21 with respect to the lower housing 15, with the ring 21 being prevented from upward or downward movement by virtue of the shoulders 17 and 19 will cause upward movements of the container 25 for rotations of the ring 21 in one direction and movements of the container 25 downwardly in response to rotations of the ring 21 in an opposite direction.

As best seen in FIG. 5, the lower region 15 has a lower termination 16. Furthermore, the lower wall 31 of the container 25 has a plurality of outlets 37 which are defined by a plurality of hollow tubular spike-like prongs 39, each one of which has an internal passageway 41 as well as a sharpened pointed end 43 designed to pierce flesh to allow the prongs to become embedded therein and an exit opening 44 in a side wall thereof. A needle guide plate 14 engages the termination 16 and is retained in assembled position by a retainer ring 22 having internal threads 34 complimentary with external threads 36 on the housing lower region 35 to allow the ring 22 to be threaded over the termination 16 to fix the plate 14 in position. The plate 14 has holes 46 therethrough allowing the needles 39 to slide therethrough when the container 25 is adjusted via rotations of the ring 21.

As best seen in FIG. 5, the container 25 inner chamber slideably receives a piston follower 48 which moves downwardly in the view of the figure responsive to pressurization of the portion of the chamber 27 thereabove as a result of pumping of air into the chamber 27 via conduit 47.

It should be understood, with particular reference to FIG. 5, that the interaction of the length of the prongs 39 and the plate 14 in conjunction with the vertical adjustability of the container 25 may be used to limit the degree of penetration of the prongs 39 within flesh.

Thus, engagement of the plate 14 and ring 22 of the lower region 15 with the surface of the flesh will limit the degree of penetration of the prongs 39 therein.

With further reference to FIG. 5, it is seen that the upper wall 29 of the container 25 includes a port 45 connected to a flexible conduit 47 for a purpose to be described in greater detail hereinafter. Furthermore, with reference to FIG. 5, it is seen that the bottom wall 31 of the container 25 may be removed from the container 25 by virtue of the complimentary threads 52, 56 on the bottom wall 31 and side wall 33 respectively.

Figure 2:
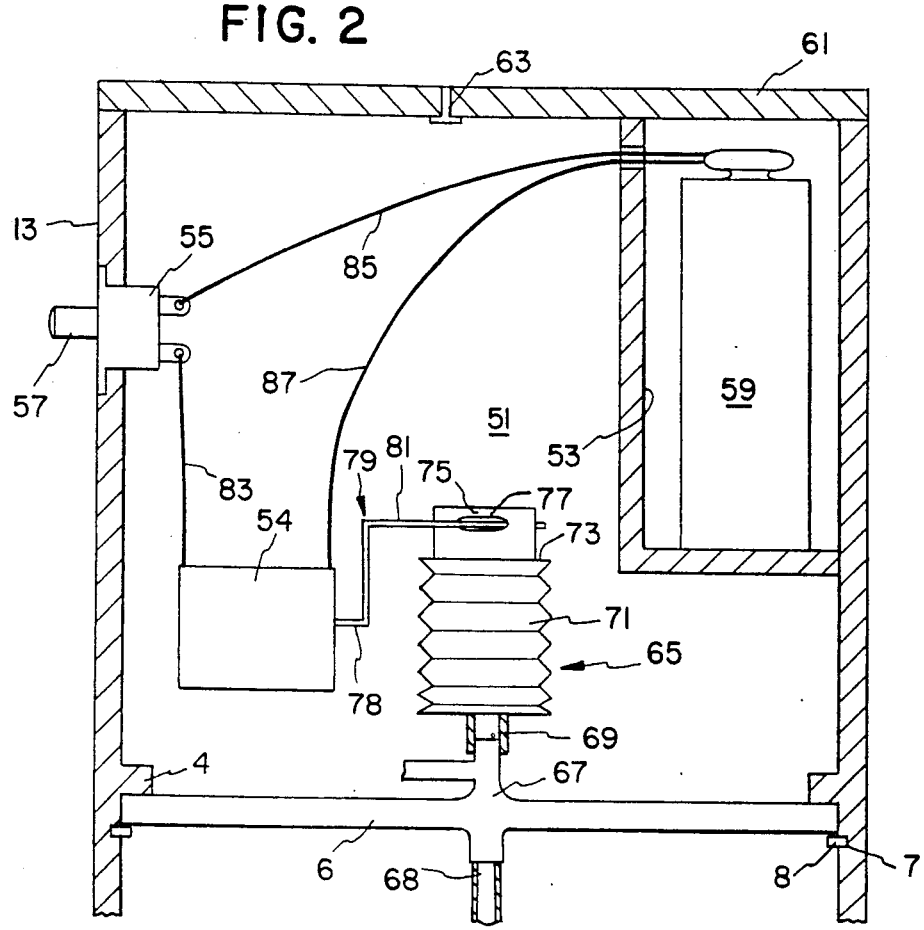
FIG. 2 shows a side view of a portion of the structure shown in FIG. 1 enlarged and with portions broken away to show detail.
Figure 3:
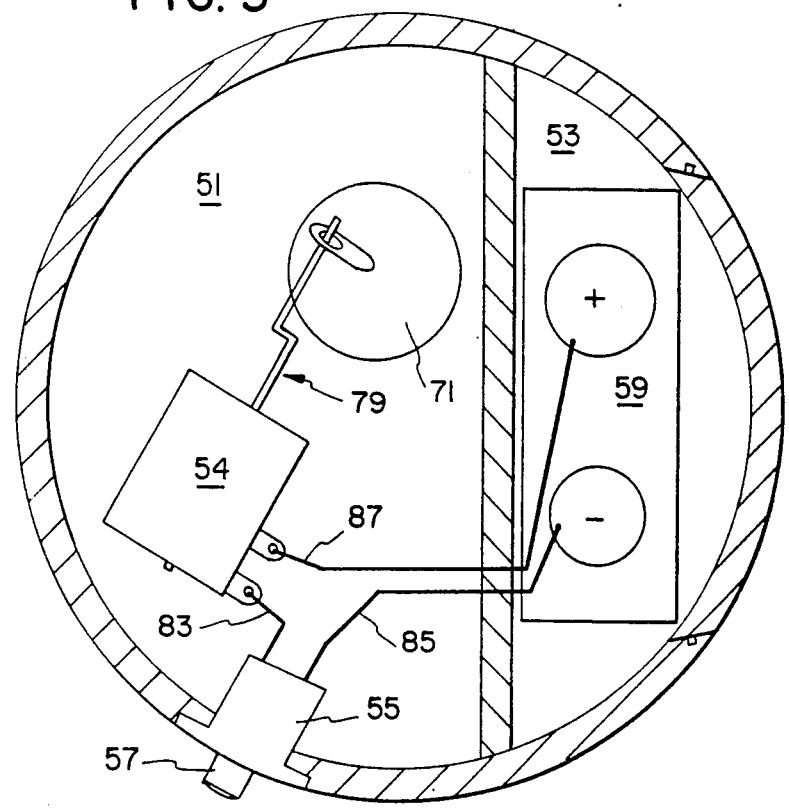
FIG. 3 shows a top view of the present invention with a top wall removed to show detail.

With reference, now, to FIGS. 2 and 3, it is seen that the upper housing region 13 has a first internal chamber 51 and a second internal chamber 53. The chamber 51 contains a motor 54 mounted therein using any suitable means and includes an on-off switch 55 having an actuating handle 57 protruding outside the region 13. The chamber 53 contains a battery 59. The region 13 has a battery access cover 61 which may be removably fastened thereto using any suitable means and the removal of which allows access to replace the battery 59. An air vent 63 is provided in the cover.

Figure 6:
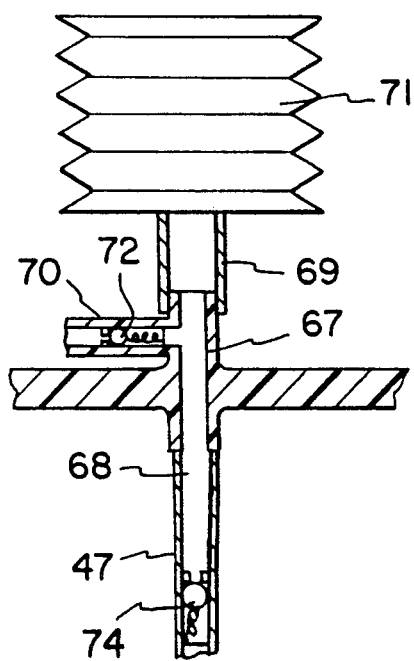
FIG. 6 shows a cross-sectional view through details of the pump forming a part of the present invention.

With further reference to FIGS. 2, 3 and 6, it is seen that a bellows-type pump 65 is mounted within the chamber 51 by virtue of a fitting 67 and the outlet hose 69 of the pump which is attached to a bellows member 71. The bellows member has a top wall 73 to which is attached a metallic plate 75 having an elongated slot 77 therein designed to receive the end 81 of a crank arm 79 forming a part of the rotary shaft 78 of the motor 54. Thus, rotary movements of the shaft 78 will result in rotations of the crank arm 79 which via the slot 77 in the plate 75 will result in reciprocatory movements of the bellows 71. Electrical conductors 83, 85 and 87 interconnect the motor 54, switch 55 and battery 59 to allow power to be provided to the motor 54 when the switch 55 is closed in a manner well known to those skilled in the art.

The region 13 has a bottom wall 6 carrying the fitting 67 as well as a fitting 68, which fittings 67 and 68 are fluidly connected to one another. The wall 6 bears against a shoulder 4 and is retained in position by a snap ring 8 retained in the groove 7.

With particular reference to FIG. 6, it is seen that the fitting 68 has connected thereto the flexible conduit 47 also seen in FIG. 5. A branch passageway 70 is provided which has contained therein a check valve mechanism 72 only allowing flow of air toward the fitting 67. The conduit 47 contains a further check valve 74 only allowing flow of air within the conduit 47 toward the fitting 45 seen in FIG. 5. Thus, when the bellows 71 is being expanded, air is sucked in through the port 63 in upper region 13 and through the branch conduit 70 through the check valve 72 while the check valve 74 prevents flow of air in the conduit 47 below the wall 6 toward the bellows 71. When the bellows 71 is being contracted, air within the bellows is forced downwardly through the conduit 47 and the check valve 74 while the check valve 72 prevents flow out the conduit 70. In this way, air is supplied to the bellows 71 via the branch conduit 70 and is exhausted through the main conduit 47 upon contraction of the bellows 71.

In the operation of the present invention, through rotations of the ring 21 and removal of ring 22 and plate 14, the container 25 may be removed from the lower region 15 and the lower wall 31 of the container 25 may be removed therefrom by unthreading it to allow access to the inner chamber 27 thereof. With such access having been accomplished, the chamber 27 may be filled with any desired seasoning of a type such as, for example, paprika, oregano, salt, pepper, or the like mixed into liquid substances. If desired, liquid substances such as jelly, frosting, filling, etc. may be loaded within the chamber 27. Thereafter, the lower wall 31 is rethreaded thereon.

Thereafter, through rotations of the ring 21, the container 25 is moved within the housing 15 to a desired position therein so that interactions between the plate 14 and ring 22 of the region 15 and the length of the prongs 39 may determine the degree of insertion of the prongs within, for example, flesh. With the position of the container 25 within the housing 15 being adjusted as desired and with the conduit 47 attached to the fitting 45, the switch 55 may be closed through movement of the actuator 57 to cause the motor 54 to operate with the crank arm 79 rotating to cause the bellows 71 to expand and contract sequentially and continuously. In this way, air is pumped through the conduit 47 and into the chamber 27 to pressurize the interior thereof and thereby force the piston follower 48 downwardly to thereby force the substance contained therein through the passageways 41 in the prongs 39, out the ports 44 and thence into the flesh or other item in which the prongs 39 have been embedded.

It may be advantageous to remove the prongs 39 from their embedded location as the motor 54 is operated to allow the substance within the chamber 27 to fill the holes formed by insertion of the prongs 39.

In this way, a desired degree of seasoning or flavoring of flesh, pastry, etc. may easily be undertaken.

As such, an invention has been disclosed in terms of a preferred embodiment thereof which fulfills each and every one of the objects of the invention and provides a new and improved motorized air pressure seasoner of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. An improved seasoning device, comprising:
   a) a container having an internal chamber and a plurality of outlets connected to hollow prongs;
   b) means for pressurizing said chamber to force a substance within said chamber out through said prongs;
   c) said container being removably mounted in a housing; and
   d) means for adjusting a position of said container within said housing comprising an outer wall of said container being threaded complimentary to an internally threaded ring on said housing whereby rotations of said ring in a first direction result in retraction of said container within said housing, and rotations of said ring in a second opposite direction result in extension of said container from said housing.

2. The invention of claim 1, wherein said means for pressurizing comprises a pump mechanism.

3. The invention of claim 2, wherein said pump mechanism comprises a bellows pump operated by a battery powered motor.

4. The invention of claim 1, wherein said housing has a lower termination defining a degree of retraction or extension of said prongs with respect to said housing.

5. The invention of claim 3, wherein said housing has a removable cover allowing access to said battery, motor and bellows pump.

* * * * *